(12) United States Patent
Pientka

(10) Patent No.: US 8,241,402 B2
(45) Date of Patent: Aug. 14, 2012

(54) METHOD OF SEPARATION OF HYDROGEN FROM GAS MIXTURES

(75) Inventor: Zbynek Pientka, Prague (CZ)

(73) Assignee: Institute of Macromolecular Chemistry AS CR, V.V.I., Prague (CZ)

( * ) Notice: Subject to any disclaimer, the term of this patent is extended or adjusted under 35 U.S.C. 154(b) by 335 days.

(21) Appl. No.: 12/675,816

(22) PCT Filed: Aug. 20, 2008

(86) PCT No.: PCT/CZ2008/000096
§ 371 (c)(1),
(2), (4) Date: Mar. 26, 2010

(87) PCT Pub. No.: WO2009/026859
PCT Pub. Date: Mar. 5, 2009

(65) Prior Publication Data
US 2010/0192771 A1    Aug. 5, 2010

(30) Foreign Application Priority Data
Aug. 28, 2007  (CZ) .................................. 2007-588

(51) Int. Cl.
*B01D 53/02* (2006.01)
(52) U.S. Cl. ............................................ 95/116; 423/248

(58) Field of Classification Search .............. 95/90, 116, 95/900; 423/210, 248, 648.1; 502/400
See application file for complete search history.

(56) References Cited

U.S. PATENT DOCUMENTS

| | | | |
|---|---|---|---|
| 3,564,816 A * | 2/1971 | Batta | 95/100 |
| 5,217,616 A * | 6/1993 | Sanyal et al. | 210/617 |
| 6,113,673 A * | 9/2000 | Loutfy et al. | 95/116 |
| 6,428,612 B1 * | 8/2002 | McPhilmy et al. | 96/132 |
| 6,432,379 B1 * | 8/2002 | Heung | 423/648.1 |
| 2007/0020172 A1 * | 1/2007 | Withers-Kirby et al. | 423/648.1 |

* cited by examiner

*Primary Examiner* — Frank Lawrence, Jr.
(74) *Attorney, Agent, or Firm* — Notaro, Michalos & Zaccaria P.C.

(57) ABSTRACT

A method of separation of hydrogen from gas mixtures consisting in that a gas mixture (3) with any hydrogen content is introduced into a closed space (4), in which a polymer foam (1) containing non-communicating pores (2) is placed. Due to the fact that the hydrogen partial pressure in pores (2) of the polymer foam (1) is lower, hydrogen penetrates into the pores. Hence, the gas mixture (3) leaving the closed space (4) is deficient in the hydrogen. The inlet of the gas mixture (3) into the closed space (4) can be interrupted at the time when the leaving mixture has the same composition as the introduced gas mixture (3) or earlier. Then the pressure in the closed space (4) is decreased and, due to the leveling of its partial pressure, hydrogen is released from the polymer foam (1) and can be received for further use. Its concentration is higher than in the starting gas mixture (3).

3 Claims, 1 Drawing Sheet

METHOD OF SEPARATION OF HYDROGEN FROM GAS MIXTURES

TECHNICAL FIELD

The invention concerns separation of hydrogen from gas mixtures using polymer foams with closed pores.

BACKGROUND ART

The most used technology of hydrogen production (steam reforming, coal gasification, hydrocarbon cracking) produce gas mixtures, from which hydrogen is obtained by an appropriate separation process. For example in hydrogen production by steam reforming, in particular pressure swing adsorption (PSA) is used for its purification described in U.S. Pat. Nos. 3,430,418 and 3,564,816. For industrial applications of adsorption, in particular zeolites and active carbon are used. In both cases, the other components are adsorbed; hydrogen is adsorbed least. The final product contains up to 99.9% of hydrogen; however, a good deal of hydrogen is lost in waste gases, which contain 35% of hydrogen. It can be stated that the hitherto used separation processes require high contents of hydrogen already in the starting mixtures, otherwise they work very ineffectively. Anyway, it is disadvantageous to adsorb components, which make a major part of the mixture. The problem consists in the nonexistence of a cheap hydrogen absorber. The most known absorbers are some precious metals (palladium), La—Ni alloys, alanates, but none of them can be used in industry. However, it can be expected that in future hydrogen will be obtained even from dilute mixtures, as is the case in biological methods of production. The proposed process is well suitable for such separations.

DISCLOSURE OF THE INVENTION

The substance of the invention is the utilization of polymer foams with non-communicating (closed) pores for separation of hydrogen from gas mixtures. Polymer foam behaves as a system of separation membranes dividing the space into cells, i.e. individual pores. Polymer membranes are permeable to various gases to variable extents. Hydrogen passes through many polymers most easily. If a gas mixture (mobile phase) flows along a polymer foam (stationary phase), hydrogen penetrates into its pores faster than other gases. It can be retained until in the foam its partial pressure outside the polymer decreases. When this happens, hydrogen abandons the polymer foam faster than other gases. For separation, the ratio of permeabilities of a given polymer to individual gases of the mixture and the dynamics of the separation process, i.e. the time dependence of pressure change and flow velocity of the mixture are decisive. At suitable dynamics the mobile phase is enriched in hydrogen.

The method of separation of hydrogen from gas mixtures consists in that the gas mixture with any hydrogen content is introduced into a closed space, in which the polymer foam containing non-communicating pores is placed. Due to the fact that the partial pressure of hydrogen in pores of the polymer foam is lower, hydrogen penetrates into the pores. Hence, the gas mixture leaving the closed space is hydrogen depleted. The inlet of the gas mixture into the closed space can be interrupted at the time when the leaving mixture has the same composition as the introduced gas mixture or earlier. Then the pressure in the closed space is decreased (e.g. by using a pump) and, due to leveling of its partial pressure, hydrogen is released from the polymer foam and can be received for further use; its concentration is higher than in the introduced gas mixture.

As polymer foam extruded foam polystyrene, bead foam polystyrene or another foam containing non-communicating pores can be used.

FIGURES

EXAMPLES

Example 1

Figure 1:
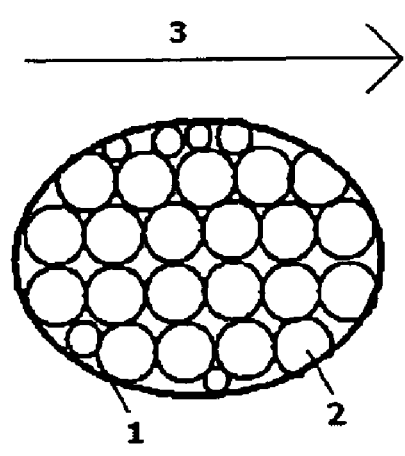
FIG. 1 shows a part of polymer foam with closed pores, along which a gas mixture flows which is a detail view of the closed space content from FIG. 2.
Figure 2:
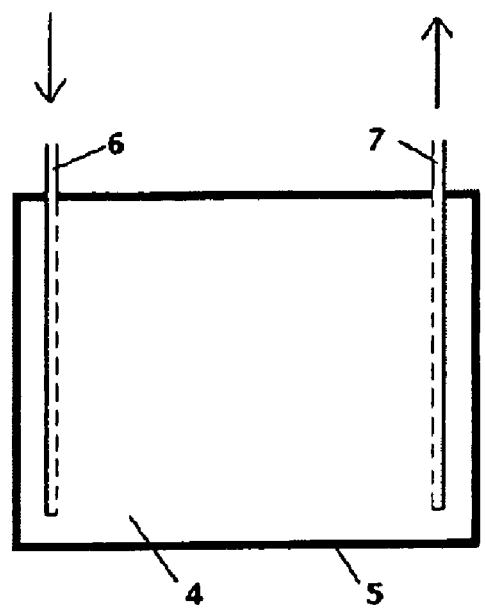
FIG. 2 shows a cross-section of the closed space for hydrogen separation.

Facade foam polystyrene was selected for separation, which consists of polystyrene foam 1 (beads) containing closed pores 2 among beads are communicating pores through which gas mixtures 3 can flow. The closed space 4 for hydrogen separation was filled up with a prism of 10 L volume made of facade foam polystyrene which was all covered with metal foil 5 glued to its surface with epoxide resin. The foil 5 prevents the gases from leaking from the prism. Two parallel channels 6, 7 for inlet and outlet of gas mixtures are drilled in the prism. The part of the prism between the channels 6, 7 is primarily used for separation; this is why the channels 6, 7 were drilled near the opposite sides of the prism. A mixture 3 of hydrogen and nitrogen in the 1:1 ratio under a pressure of 100 kPa was introduced at a rate of 5 ml/s into channel 6. The mixture 3 passed through pores among beads. Mixture 3 was issued from channel 7 its composition changed with time. Before the amount of mixture 3 corresponding to ca. half of the prism volume was introduced into channel 6 the issued mixture contained less than 1% of hydrogen. After that the hydrogen concentration in the outgoing mixture was successively growing until it reached the same composition as the introduced mixture. Thus ca. 8 L of hydrogen, i.e. ca. 80% of the prism volume, was stored in the prism. Then neat nitrogen was introduced into channel 6. The mixture issued from channel 7 contained ca 50% of hydrogen.

Example 2

Facade foam polystyrene, consisting of polymer foam 1 (beads) containing closed pores 2, was selected for separation, whereas, among these pieces (beads) are communicating pores through which gas mixtures 3 can flow. The closed space 4 for hydrogen separation was filled up with a prism of 10 L volume made of facade foam polystyrene slab which was all covered with metal foil 5 glued to its surface with epoxide resin. The foil 5 prevents the gases from leaking from the prism. Two parallel channels 6, 7 for inlet and outlet of gas mixtures 3 are drilled in the prism. The part of the prism between the channels 6, 7 is primarily used for separation; this is why the channels 6, 7 were drilled near the opposite sides of the prism. A mixture 3 of hydrogen and nitrogen in the 1:1 ratio under a pressure of 200 kPa was introduced at a rate of 5 ml/s into channel 6. After filling the polymer foam with hydrogen the inlet was closed and the composition of the mixture going out of the prism was monitored. The hydrogen concentration exceeded 90%.

Example 3

Extruded foam polystyrene containing closed pores 2 was selected for separation. The closed space 4 for hydrogen separation was filled up with a prism of 10 L volume made of the given polystyrene which was all covered with metal foil 5 glued to its surface with epoxide resin. The foil 5 prevents the gases from leaking from the prism. A series of parallel channels at the 3-cm distances were drilled in the prism. A gas mixture of hydrogen and nitrogen, in the 1:1 ratio under a pressure of 100 kPa to be separated was introduced into the channels in series connection. Initially, the mixture at the outlet contained less than 1% of hydrogen. The hydrogen concentration attained the same value as at the inlet after the prism contained ca. 7 L of hydrogen.

Industrial Applicability

The method of separation of hydrogen from gas mixtures is suitable also for mixtures where hydrogen is a minority component. For instance, waste gases from the pressure swing adsorption (PSA) process contain 35% of hydrogen that can be further utilized.

The invention claimed is:

1. A method of separation of hydrogen from hydrogen-containing gas mixtures characterized in that the gas mixture (3) is introduced into a closed space (4) filled with polymer foam (1) containing non-communicating pores (2), the constituent polymer of which is more permeable to hydrogen than to the other components of the gas mixture (3), for a time period during which at least a part of the hydrogen in the gas mixture (3) is absorbed in polymer foam (1), then the pressure in the closed space (4) is reduced and an escaping gas mixture rich in hydrogen is received.

2. The method of separation of hydrogen according to claim 1 characterized in that the polymer foam (1) is extruded foam polystyrene.

3. The method of separation of hydrogen according to claim 1 characterized in that the polymer foam (1) is bead foam polystyrene.

* * * * *